US005349736A

United States Patent [19]

Rubino et al.

[11] Patent Number: 5,349,736

[45] Date of Patent: Sep. 27, 1994

[54] METHOD AND TOOL FOR PULLING CLUTCH FROM WASHING-MACHINE MOTOR

[75] Inventors: Michael Rubino, Chicago, Ill.; John Hart, Downsview, Canada

[73] Assignee: Hart to Sensible Products, Inc., Chicago, Ill.

[21] Appl. No.: 24,200

[22] Filed: Feb. 26, 1993

[51] Int. Cl.$^5$ .............................................. B23P 19/04

[52] U.S. Cl. ..................................... 29/426.5; 29/259; 29/261; 29/262

[58] Field of Search .......... 29/244, 245, 256, 258–261, 29/263–266, 274, 426.5, 898.08; 81/3.29, 3.36, 3.37

[56] References Cited

U.S. PATENT DOCUMENTS 2,170,461 8/1939 Pepperdine .
2,188,074 1/1923 Condon .
2,408,450 10/1946 Schrader ............................... 29/259
3,299,497 1/1967 Chmielewski ......................... 29/258
3,383,755 5/1968 Chmielewski .
3,689,978 9/1972 Kelso .................................... 29/259
3,735,471 5/1973 Kappler .
3,846,898 11/1974 Kerr .
3,978,575 9/1976 Beyer et al. ...................... 29/256 X
4,060,884 12/1977 Hamilton .......................... 29/263 X
4,065,844 1/1978 Lieser et al. .......................... 29/258
4,077,103 3/1978 Kelley .
4,174,558 11/1979 Dombrowski .
4,274,189 6/1981 Conover .............................. 29/256
4,502,197 3/1985 Harder ................................. 29/259
4,656,715 4/1987 Diaz .
4,771,528 9/1988 Stromberg ............................ 29/259
4,798,106 1/1989 Foster .................................. 81/3.29
4,929,111 5/1990 Lauritano ......................... 29/261 X
4,970,771 11/1990 Wood .
4,989,311 2/1991 Rosin ..................................... 29/259
4,989,312 2/1991 Maddalena ............................ 29/259
5,033,180 7/1991 Colson ................................. 29/259

FOREIGN PATENT DOCUMENTS 273191 6/1927 United Kingdom .................. 29/265

OTHER PUBLICATIONS

Document No. 829129 having FIGS. 1–4 illustrating a removing mechanism (no date).

*Primary Examiner*—Peter Dungba Vo
*Attorney, Agent, or Firm*—Milton S. Gerstein

[57] ABSTRACT

A tool for pulling off the clutch mechanism of one specific make of washing machine. The tool has main mounting plate from each end off which passes therethrough an elongated screw. The mounting plate has an enlarged central hole for passing therethrough a large tubular member which is threaded on its outer circumferential surface, and which is hollow in it interior. The tubular member receives in its hollow interior the tubular sleeve of the clutch mechanism when the tool of the invention is used for pulling the clutch mechanism off from the drive shaft. At the bottom of tubular member, there is provided a larger-diameter head, having a pivotal latch. After placing the tubular member over the tubular sleeve, the pivotal latch is closed over cutout portion at the lower portion of the tubular sleeve, whereby the latch is thus in locked engagement with the tubular sleeve but free of contact with the inner drive shaft. The tool is then used by rotating a nut mounted on the upper end of the tubular member and above the mounting plate. Since the bottom heads of the two screws at the ends of the mounting plate are in contact against the motor housing, rotation of the nut causes the tubular member to be lifted up thereby, bringing along with the enlarged bottom head and tubular sleeve, and, therefore, the entire clutch mechanism along with it.

14 Claims, 3 Drawing Sheets

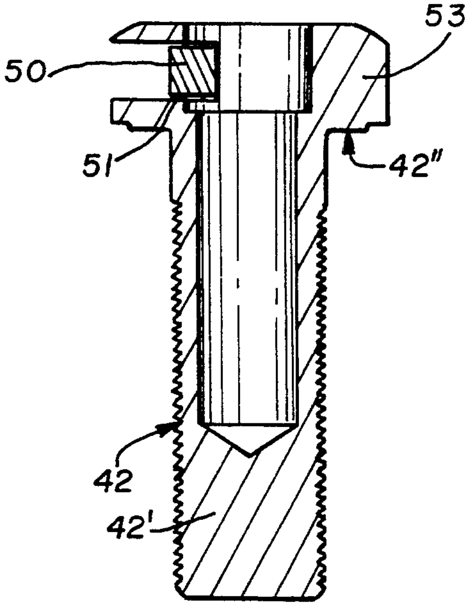
FIG. 5
FIG. 4
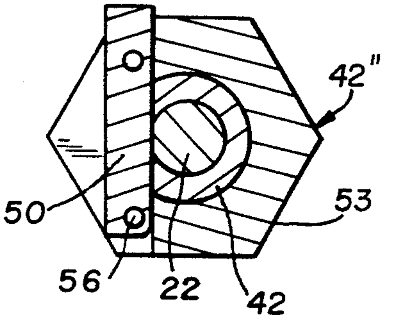
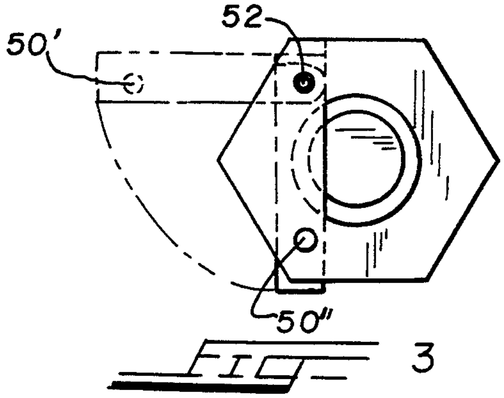
FIG. 3
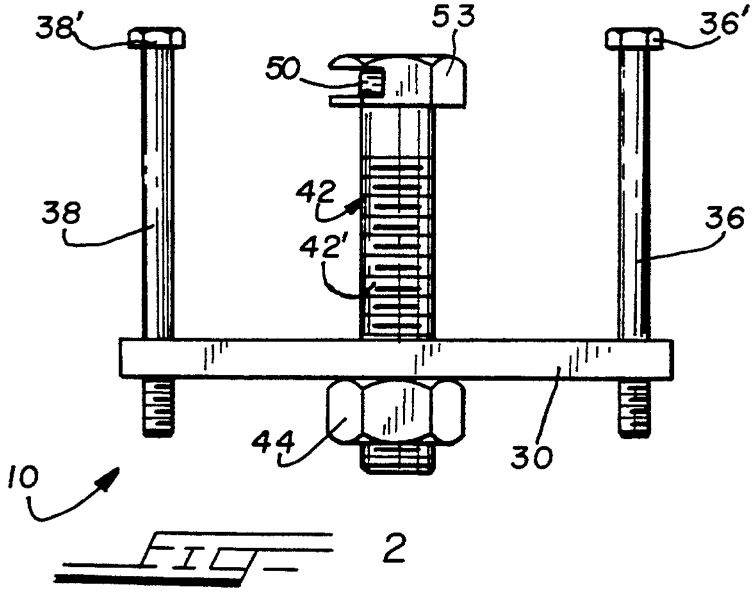
FIG. 2

METHOD AND TOOL FOR PULLING CLUTCH FROM WASHING-MACHINE MOTOR

BACKGROUND OF THE INVENTION

The present invention is directed to a tool for pulling off the clutch of a motor associated with a washing machine manufactured by the General Electric Company. The clutch mechanism of G.E. washing machines is similar to other brands in that they are engaged by centrifugal force. As the motor rotates the clutch mechanism, the clutch expands by centrifugal force, and then engages the main frame of the washing machine tumbler for rotating it, as well as the clothes therein to be washed. The drive motor is coupled to the clutch mechanism by its drive shaft, which drive shaft is telescopingly received in a tubular sleeve that fits over the drive shaft. A U-shaped groove is formed near the bottom of the sleeve for receiving a clip which secures a bracket for fixedly connecting the sleeve to the drive shaft for conjoint rotation. The bracket is in abutting contact against a corresponding, juxtapositioned portion of the drive shaft by way of a cutout formed in a lower portion of the tubular sleeve, which thereby exposes the portion of the drive shaft for the bracket to contact, whereby the above-mentioned fixed connection and conjoint rotation are achieved. If the clutch mechanism fails and/or needs replacement, or if the motor itself needs repair or replacement, then the bracket is removed, and the clutch mechanism must be pulled off, which is achieved by forcibly pulling the tubular sleeve off of the drive shaft. However, since the parts are usually old and rusted, it is usually very difficult to pull the sleeve off from the drive shaft. Such pulling off is typically, conventionally achieved by using screw drivers serving as levers, and trying to pry the sleeve off by leverage. However, this a time-consuming and difficult operation, and in some instances, cannot be accomplished at all, thus requiring the complete replacement of both the clutch mechanism and its motor, even though the motor may be fine and only the clutch mechanism needing replacement.

The present invention provides a tool that will allow for the removal of the clutch mechanism from the drive shaft in a much easier, safer and more reliable manner.

SUMMARY OF THE INVENTION

It is the primary objective of the present invention to provide a tool for pulling off the clutch mechanism of one specific make of washing machine.

Toward these and other ends, the tool of the invention has main mounting plate, from each end off which passes therethrough an elongated screw. The mounting plate has an enlarged central hole for passing therethrough a large tubular member which is threaded on its outer, circumferential surface, and which is hollow in its interior. The tubular member receives in its hollow interior the tubular sleeve of the clutch mechanism when the tool of the invention is used for pulling the clutch mechanism off from the drive shaft. At the bottom of tubular member, there is provided a larger-diameter head, having a pivotal latch. After placing the tubular member over the tubular sleeve, the pivotal latch is closed over cutout portion at the lower portion of the tubular sleeve, whereby the latch is, thus, in locked engagement with the tubular sleeve but free of contact with the inner drive shaft. The tool is then used by rotating a nut mounted on the upper end of the tubular member and above the mounting plate. Since the bottom heads of the two screws at the ends of the mounting plate are in contact against the motor housing, rotation of the nut causes the tubular member to be lifted up thereby, bringing along with it the enlarged bottom head and tubular sleeve, and, therefore, the entire clutch mechanism along with it.

BRIEF DESCRIPTION OF THE DRAWINGS

The invention will be more readily understood with reference to the accompanying drawing, wherein:

FIG. 2 is a side elevational view of the tool as assembled;

FIG. 3 is a bottom view of the central tubular member with pivotal latch;

FIG. 4 is a cross-sectional view showing the pivotal latch member in its locked, engaging position against a portion of an outer tubular sleeve that telescopingly receives a drive shaft of a washing-machine motor;

FIG. 5 is a side elevational view, in cross section, of the central tubular member.

DETAILED DESCRIPTION OF THE INVENTION

Figure 1:
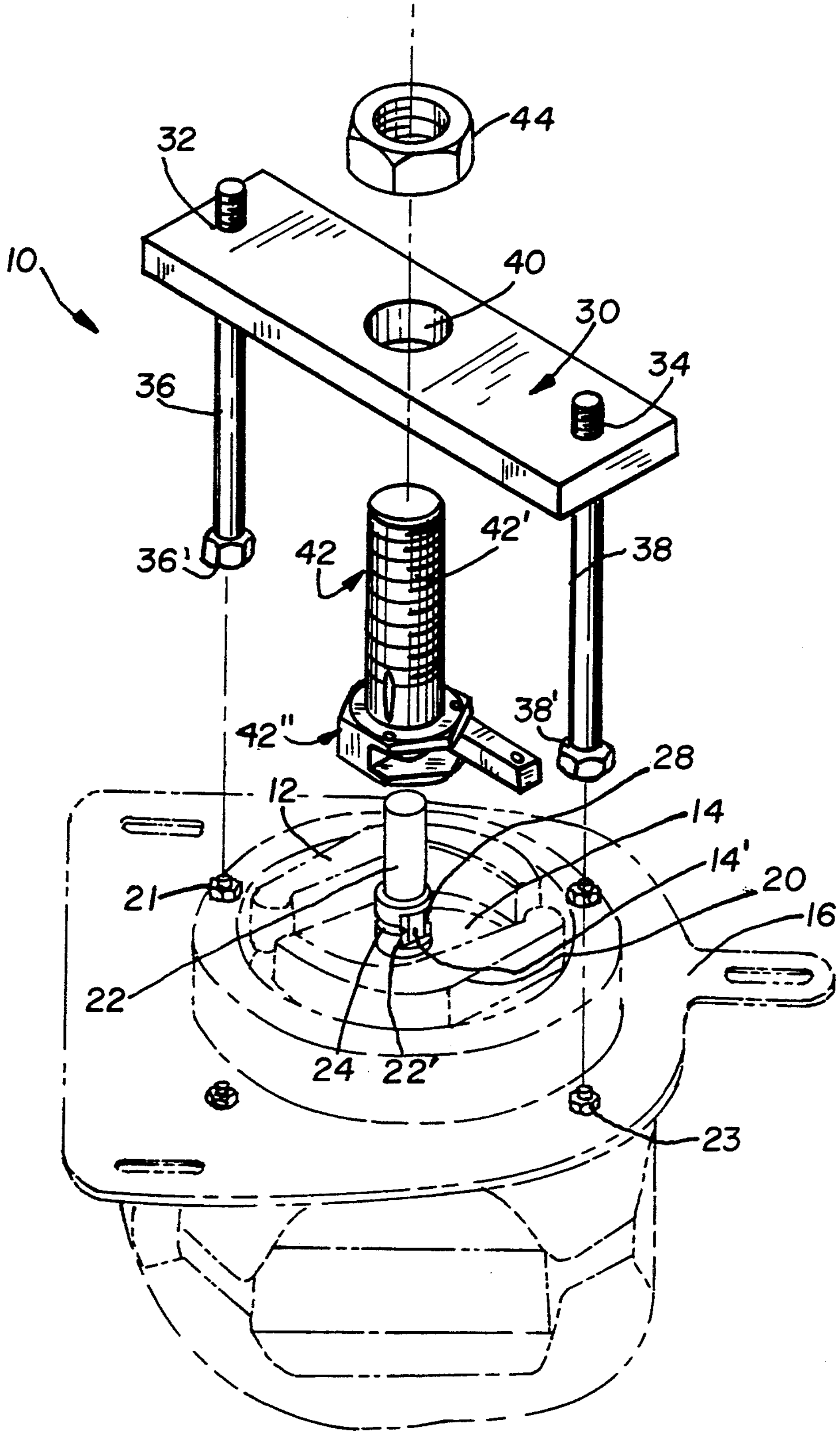
FIG. 1 is an assembly view, in perspective, snowing the tool of the invention.

Referring now to the drawings in greater detail, and to FIGS. 1–5, there is shown a tool 10 of the invention. The tool 10 is used for removing, or pulling off, a clutch mechanism indicated by reference numeral 12 in FIG. 1. The clutch mechanism 12 forms part of a washing-machine drive that rotates the tumbler housing in which soiled clothing is placed for washing. The washing machines to which the tool of the present invention is directed are those manufactured by the General Electric Co., of Schenectedy, N.Y. These washing machines include a drive motor 14 having a drive shaft 14', and a mounting plate 16 forming part of the motor housing. The clutch mechanism 12 is a centrifugal-force clutch plate 20 that expands as it is rotated. Rotation of the clutch plate is achieved by telescopingly mounting a tubular sleeve 22 over the drive shaft 14'. The tubular sleeve projects upwardly from the center of the clutch plate 20, as can be seen in FIG. 1. The open end of the tubular sleeve faces downwardly for inserting therein the upstanding drive shaft 14'. The tubular sleeve 22 is provided with a partial cut-out section 22' in its larger-diameter lower portion, which cutout-section is adjacent the lower end. The cut-out section 22' exposes the portion of the drive-shaft 14' juxtapositioned thereat. A U-shaped groove 24 surrounds the outer circumference of this lower portion of the tubular sleeve member, with the U-shaped groove having a first end at one side of the cutout-section 22', and another end at the opposite side of the cutout-section 22'. This U-shaped cutout-section 22' receives therein a U-shaped retaining clip (not shown), which retaining clip mounts a bracket in the cutout-section 22' proper, whereby the bracket couples the outer, tubular sleeve member 22 to the interiorly-positioned drive shaft 14', whereby conjoint rotation of the drive shaft and the tubular sleeve member, and, therefore, the entire clutch mechanism 12, takes place.

The above-description of the washing machine drive train is unique to General Electric-brand washing machines. This uniqueness essentially centers on the cutout-section 22′ for providing means for coupling the drive shaft directly to the clutch mechanism. By virtue of this cutout-section 22′, there is provided, or exposed, a step, or inwardly-extending lip 28, which, according to the tool of the invention, is used for pulling off the tubular member, and, thus, the entire clutch mechanism 12, as described below in detail.

The tool 10 includes a substantially, rectangular-shaped mounting plate 30 having a pair of end-holes 32, 34 for threadingly receiving a pair of elongated screws 36, 38 with heads 36′, 38′, respectively. The screws 36, 38 are arranged such that the heads are located below the mounting plate 30. The mounting plate also has a larger, central hole, or opening, 40 for threadingly receiving a relatively large bolt 42 having a threaded shank portion 42′ and an enlarged end-portion 42″. The bolt 42 may be completely hollow from one end to the other end, or substantially so from its lower end toward its upper end. In the preferred form, the enlarged end-portion is shaped like a hexagonal-shaped nut. The bolt 42 is positioned such that the enlarged end-portion 42″ is below the mounting plate 30, like the heads 36′, 38′.

As can be seen in FIG. 1, the two screws 36, 38 are positioned, when using the tool, directly over a pair of screw-heads 21, 23 forming part of the mounting plate 16 of the motor-housing. The heads 36′, 38′ are placed directly onto the heads 21, 23, respectively, so that when the tool 10 is being used, the forces created in the motor-housing and plate 16 do not tend to crack or warp the plate 16. Instead, compressive forces are taken up by the full lengths of the screws associated with the heads 21, 23.

Referring to FIGS. 2–5, there is better seen the enlarged end-portion, or head-portion, 42″ of the bolt 42. The enlarged end-portion also defines a hollow interior, and has associated with it a locking, or clamping, device for removably securing the enlarged end-portion 42″, and, therefore, the bolt 42, to the tubular sleeve 22. In the preferred embodiment, the clamping device is a pivotally-mounted latch-member 50. The latch-member, or arm, has a first end pivotally connected to a portion of the enlarged end-portion by means of a pivot pin 52 that passes through aligned holes in the end of the latch-arm and in the associated portion of the enlarged end-portion at which the latch-arm is pivoted. As can be seen in FIGS. 2 and 5, when the latch-arm 50 is rotated to its closed, clamping position, the latch-arm substantially lies completely within the hollow interior of the enlarged end-portion. When rotated in the opposite direction, as indicated in dotted lines in FIG. 3, the free end 50′ is spaced outside of the hollow interior of the enlarged end-portion 42″. The enlarged end-portion 42″ is open along a portion of its vertical sides in order to accommodate the movement of the latch-arm into and out of the hollow interior of the enlarged end-portion 42″. The remaining circumference of the enlarged end-portion 42″ is provided with a vertical side wall 53. The end 50′ is provided with a through-hole 50″ extending through the thickness of the latch-arm. A pair of corresponding holes 52 are formed in the upper and lower surfaces of the enlarged end-portion 42″ which align with the hole 50″ when the latch-arm is closed to the position shown in FIG. 4, whereupon a latch-pin 56 is passed through the upper hole of the pair of holes 52, hole 50″ of the end of the latch-arm, and then through the bottom hole of the pair of holes 52. The latch-arm, when pivoted to its closed, clamping position, will abut flush against the cutout-section 22′. The width of the latch-arm, as taken in the vertical direction when viewing FIGS. 1, 2 and 5, is less than the height of the cutout-section 22′, as taken in the vertical direction when viewing FIG. 1, so that the upper flat surface 51 of the enlarged end-portion 42″ is positioned directly underneath the protruding, horizontal step, or lip, 28.

In using the tool 10, after the U-shaped retaining clip and associated clamping bracket of the clutch-mechanism have been removed, thus exposing the cutout-section 22′, the bolt 42 is placed over the tubular sleeve 22 of the clutch mechanism of the washing machine, rotating the bolt in order to orient it such that the pivoted-open latch-arm 50 is juxtapositioned over the cutout-section 22′, while also ensuring that the heads 36′, 38′ are placed directly on the heads 21, 23, respectively. Thereafter, as seen in FIG. 2, there is threaded onto the end of the bolt 42 projecting upwardly and out of the central hole 40, a nut 44. The nut 44 is rotated by a wrench, or the like, after the tool 12 has been placed into position. Rotation of the nut 44 causes the bolt 42 to be lifted up, as the reaction force is provided by the screws 36, 38 and their contact against the screws associated with the heads 21, 23. In order to make the rotation of the nut 44 easier, the bolt 42 is provided with an outer threaded surface of narrow pitch. As the nut 44 is rotated, while pushing down on the tool to force contact between the heads 36′, 38′ with the heads 21, 23, respectively, the bolt 42 will thereby be lifted up, and thereby pull off the tubular sleeve 22 via the contact between the upper surface 51 of the latch-arm and the undersurface of the protruding step or lip 28 of the tubular sleeve.

Figure 6:
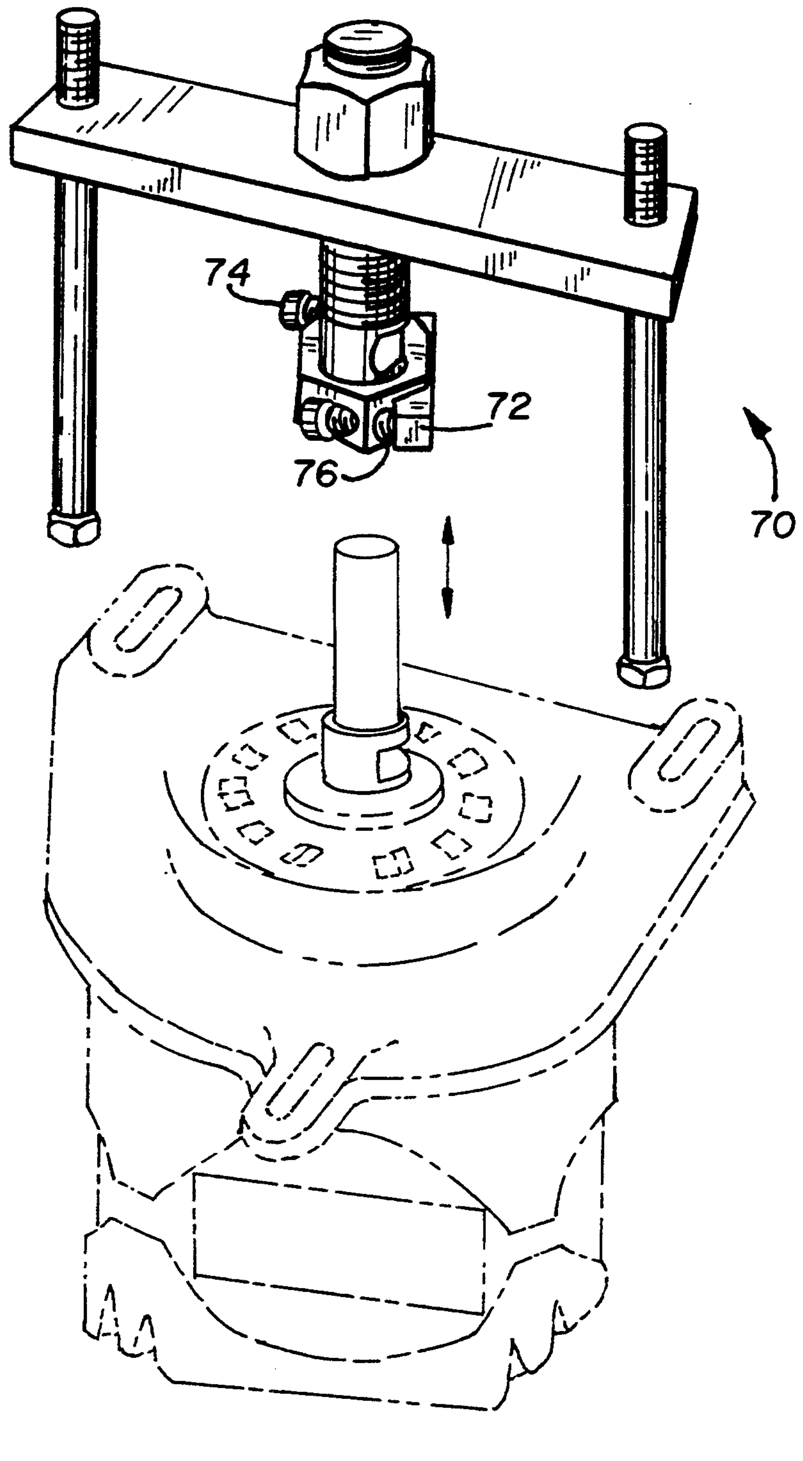
FIG. 6 is an assembly view, in perspective of a second embodiment of the tool of the invention.

FIG. 6 shows a modified form of the invention 70. The tool 70 is substantially identical to the tool 10 except that the pivoted latch-arm 50 has been replaced by a separate latch-bar 72 that is not connected to the enlarged end-portion of the bolt. Instead, a pair of parallel screws 74, 76 are threaded through a pair of parallel through-holes formed in the enlarged end-portion. The latch-bar has a pair of receiving holes formed through its ends, one on each end, for receiving the screws 74, 76. By rotating the screws 74, 76, the latch-bar 72 is drawn toward the enlarged end-portion, into the cutout-section 22′, as above-described for the tool 10. Otherwise, the tool 70 is used just the same as the tool 10. The tool 10 is preferred, since the tool 70 may be prone to jamming, since if tightened too much, the latch-bar 72 may contact the actual drive-shaft exposed through the cutout-section 22′, thereby preventing removal of the tubular sleeve and the clutch attached thereto.

It is noted that other embodiments of the invention may take form, as long the tool provides a reaction force from a portion of the motor housing, which allows the pulling up of the tubular sleeve in opposition to this reaction force.

While a specific embodiment of the invention has been shown and described, it is to be understood that numerous changes and modifications may be made therein without departing from the scope, spirit and intent of the invention as set forth in the appended claims.

What we claim is:

1. A tool for removing a clutch from a washing machine, comprising:

a mounting plate having a first end-portion and a second end-portion;

said mounting plate having an opening;

a bolt passing through said opening, said bolt having a threaded shank portion and a lower, enlarged end-portion, said bolt being movable in said opening, and having a hollow interior, and an open lower end for allowing entry into said hollow interior;

means operatively connected to said enlarged end-portion for temporarily attaching said bolt to a tubular sleeve of a washing machine clutch-mechanism;

said means for temporarily attaching said bolt to a tubular sleeve of a washing machine clutch-mechanism comprising a pivotal latch having a first end pivotally mounted to a first portion of said enlarged end-portion, and a second end, and means for selectively locking said second end of said latch to a second portion of said enlarged end-portion after said bolt has been telescopingly mounted over a tubular sleeve of a washing-machine clutch mechanism, whereby, when said enlarged end-portion is moved away from the clutch-mechanism, it pulls off the tubular sleeve of the clutch-mechanism from engagement with the motor drive-shaft.

2. The tool for removing a clutch from a washing machine according to claim 2, wherein said means for selectively locking said second end of said latch to a second portion of said enlarged end-portion comprises a first through-hole formed in said second end of said latch, and a retaining pin; said second portion of said enlarged end-portion comprising a second through-hole for alignment with said first through-hole when said latch is moved to its closed, locking position; said retaining pin passing through said first and second through-holes.

3. The tool according to claim 1, wherein each of said end-portions has a hole formed therethrough;

and a pair of elongated screws, one said screw passing through one said hole, and the other said screw passing through the other said hole, each said screw having a lower end;

said lower ends of said screws and said bolt being positioned on the same side of said mounting plate;

a nut for said threaded shank portion of said bolt, said nut being positioned on the opposite side of said mounting plate as said lower ends of said screws and said bolt;

whereby, when said nut is rotated, said enlarged end-portion and said bolt are moved close to said mounting plate to thereby pull off the tubular sleeve of the clutch-mechanism from engagement with the motor drive-shaft, with said screws providing the reaction force.

4. A tool for removing a clutch from a drive-mechanism for rotating the tumbler of a washing machine, said drive-mechanism comprising a drive-motor, a drive-shaft extending through a plate of said drive-motor and driven by said drive-motor, and a clutch-mechanism driven by said drive-motor by means of said drive-shaft, said clutch mechanism comprising a clutch-plate, and a tubular sleeve connected to said clutch plate, said tubular sleeve having a hollow interior for being telescopingly mounted over said drive-shaft for conjoint rotation therewith; said tubular sleeve having a lower cutout-section having an upper step by which said drive-shaft is exposed, said tool comprising:

a tool operatively associated with said lower cutout-section and said upper step thereof for removing said clutch-mechanism from said washing machine;

said tool comprising a gripping section received in said lower cutout-section and in contact against said upper step, whereby said tool removes said clutch mechanism by pulling said clutch mechanism via said contact between said upper step and said gripping section, said gripping section comprising latch means, said latch means being selectively engaging and gripping said lower cutout-section of said tubular sleeve.

5. The tool according to claim 4, wherein said tool comprises:

a mounting plate having a first end-portion and a second end-portion;

said mounting plate having an opening;

a bolt passing through said opening, said bolt having a threaded shank portion and a lower, enlarged end-portion, said bolt being movable in said opening, and having a hollow interior, and an open lower end for allowing entry into said hollow interior;

means operatively connected to said enlarged end-portion for temporarily attaching said bolt to a tubular sleeve of a washing machine clutch-mechanism, whereby, when said enlarged end-portion is moved away from the clutch-mechanism, it pulls off the tubular sleeve of the clutch-mechanism from engagement with the motor drive-shaft;

said means for temporarily attaching said bolt to a tubular sleeve of a washing machine clutch-mechanism comprising a pivotal latch having a first end pivotally mounted to a first portion of said enlarged end-portion, and a second end, and means for selectively locking said second end of said latch to a second portion of said enlarged end-portion, after said bolt has been telescopingly mounted over a tubular sleeve of a washing-machine clutch mechanism, whereby, when said enlarged end-portion is moved away from the clutch-mechanism, it pulls off the tubular sleeve of the clutch-mechanism from engagement with the motor drive-shaft.

6. The tool according to claim 4, wherein said tool, comprises:

a mounting plate having a first end-portion and a second end-portion;

each of said end-portions having a hole formed therethrough;

a pair of elongated screws, one said screw passing through one said hole, and the other said screw passing through the other said hole, each said screw having a lower end;

said mounting plate also having a central opening;

a bolt passing through said central opening, said bolt having a threaded shank portion and a lower, enlarged end-portion, said lower ends of said screws and said bolt being positioned on the same side of said mounting plate, said bolt having a hollow interior, and an open lower end for allowing entry into said hollow interior;

a nut for said threaded shank portion of said bolt, said nut being positioned on the opposite side of said mounting plate as said lower ends of said screws and said bolt;

said gripping section comprising means for temporarily attaching said bolt to said tubular sleeve of said washing machine clutch-mechanism operatively unconnected to said enlarged end-portion, whereby when said nut is rotated, said enlarged end-portion and said bolt are moved close to said mounting plate to thereby pull off the tubular sleeve of the clutch-mechanism from engagement with the motor drive-shaft, with said screws providing the reaction force.

7. The tool according to claim 6, wherein said means for temporarily attaching said bolt to said tubular sleeve of said washing machine clutch-mechanism comprises a pivotal latch having a first end pivotally mounted to a first portion of said enlarged end-portion, and a second end, and means for selectively locking said second end of said latch to a second portion of said enlarged end-portion, after said bolt has been telescopingly mounted over said tubular sleeve of said washing-machine clutch mechanism.

8. The tool according to claim 7, wherein said means for selectively locking said second end of said latch to a second portion of said enlarged end-portion comprises a first through-hole formed in said second end of said latch, and a retaining pin; said second portion of said enlarged end-portion comprising a second through-hole for alignment with said first through-hole when said latch is moved to its closed, locking position; said retaining pin passing through said first and second through-holes.

9. The tool according to claim 6, wherein said means for temporarily attaching said bolt to said tubular sleeve of said washing machine clutch-mechanism comprises a locking plate having a first through-hole and a second through-hole; and a pair of retaining screws, one said retaining screw for one said through-hole; said enlarged end-portion of said bolt having a third through-hole for alignment with said first through-hole, and a fourth through-hole for alignment with said second through-hole; one said retaining screw passing through said first and third through-holes, and the other said retaining screw passing through said second and fourth through-holes; whereby, after said bolt has been telescopingly mounted over said tubular sleeve of said washing-machine clutch mechanism, said retaining screws are rotated to draw said locking plate toward said enlarged end-portion in order to locate said locking plate in a lower cutout-section of the tubular sleeve.

10. A method of removing a clutch-mechanism from a drive-shaft of a drive-mechanism for rotating the tumbler of a washing machine, said drive-mechanism comprising a drive-motor, a drive-shaft extending through a portion of the housing of said drive-motor and driven by said drive-motor, and a clutch-mechanism driven by said drive-motor by means of said drive-shaft, said clutch mechanism comprising a clutch-plate, and a tubular sleeve connected to said clutch plate, said tubular sleeve having a hollow interior for being telescopingly mounted over said drive-shaft for conjoint rotation therewith; said tubular sleeve having a lower cutout-section having an upper step by which said drive-shaft is exposed, and a tool for removing said clutch-mechanism from said drive-shaft, said method comprising:

(a) telescopingly mounting a hollow member of said tool over the tubular sleeve;

(b) removably securing the hollow member to the tubular sleeve via the cutout-section of the tubular sleeve; and (c) pulling up on the hollow member to pull off the tubular sleeve and the clutch plate attached thereto;

said step (b) comprising placing a latch-member underneath the upper step of the cutout-section, said step (c) comprising contacting an upper surface of the latch-member against the lower surface of said upper step.

11. The method according to claim 10, wherein said step (c) comprises pushing the tool against the motor housing to provide a reaction force, and then causing the hollow sleeve up.

12. The method according to claim 11, wherein the hollow member is a bolt, and the tool comprises an exteriorly-threaded bolt passing through a hole of a mounting plate, said step of causing the hollow sleeve up comprising rotating a nut on the end of the bolt projecting through the opening.

13. A tool for removing a clutch from a washing machine, comprising:

a mounting plate having a first end-portion and a second end-portion;

said mounting plate having an opening;

a bolt passing through said opening, said bolt having a threaded shank portion and a lower, enlarged end-portion, said bolt being movable in said opening, and having a hollow interior, and an open lower end for allowing entry into said hollow interior;

means operatively connected to said enlarged end-portion for temporarily attaching said bolt to a tubular sleeve of a washing machine clutch-mechanism, whereby, when said enlarged end-portion is moved away from the clutch-mechanism, it pulls off the tubular sleeve of the clutch-mechanism from engagement with the motor drive-shaft;

said means for temporarily attaching said bolt to a tubular sleeve of a washing machine clutch-mechanism comprising a locking plate having a first through-hole and a second through-hole; and a pair of retaining screws, one said retaining screw for one said through-hole; said enlarged end-portion of said bolt having a third through-hole for alignment with said first through-hole, and a fourth through-hole for alignment with said second through-hole; one said retaining screw passing through said first and third through-holes, and the other said retaining screw passing through said second and fourth through-holes; whereby, after said bolt has been telescopingly mounted over a tubular sleeve of a washing-machine clutch mechanism, said retaining screws are rotated to draw said locking plate toward said enlarged end-portion in order to locate said locking plate in a lower cutout-section of the tubular sleeve.

14. The tool according to claim 13, wherein each of said end-portions has a hole formed therethrough;

and a pair of elongated screws, one said screw passing through one said hole, and the other said screw passing through the other said hole, each said screw having a lower end;

said lower ends of said screws and said bolt being positioned on the same side of said mounting plate;

a nut for said threaded shank portion of said bolt, said nut being positioned on the opposite side of said mounting plate as said lower ends of said screws and said bolt;

whereby, when said nut is rotated, said enlarged end-portion and said bolt are moved close to said mounting plate to thereby pull off the tubular sleeve of the clutch-mechanism from engagement with the motor drive-shaft, with said screws providing the reaction force.

* * * * *